J. E. LENHOLT.
COUPLING FASTENER.
APPLICATION FILED OCT. 22, 1919. RENEWED OCT. 20, 1920.
1,378,693.
Patented May 17, 1921.
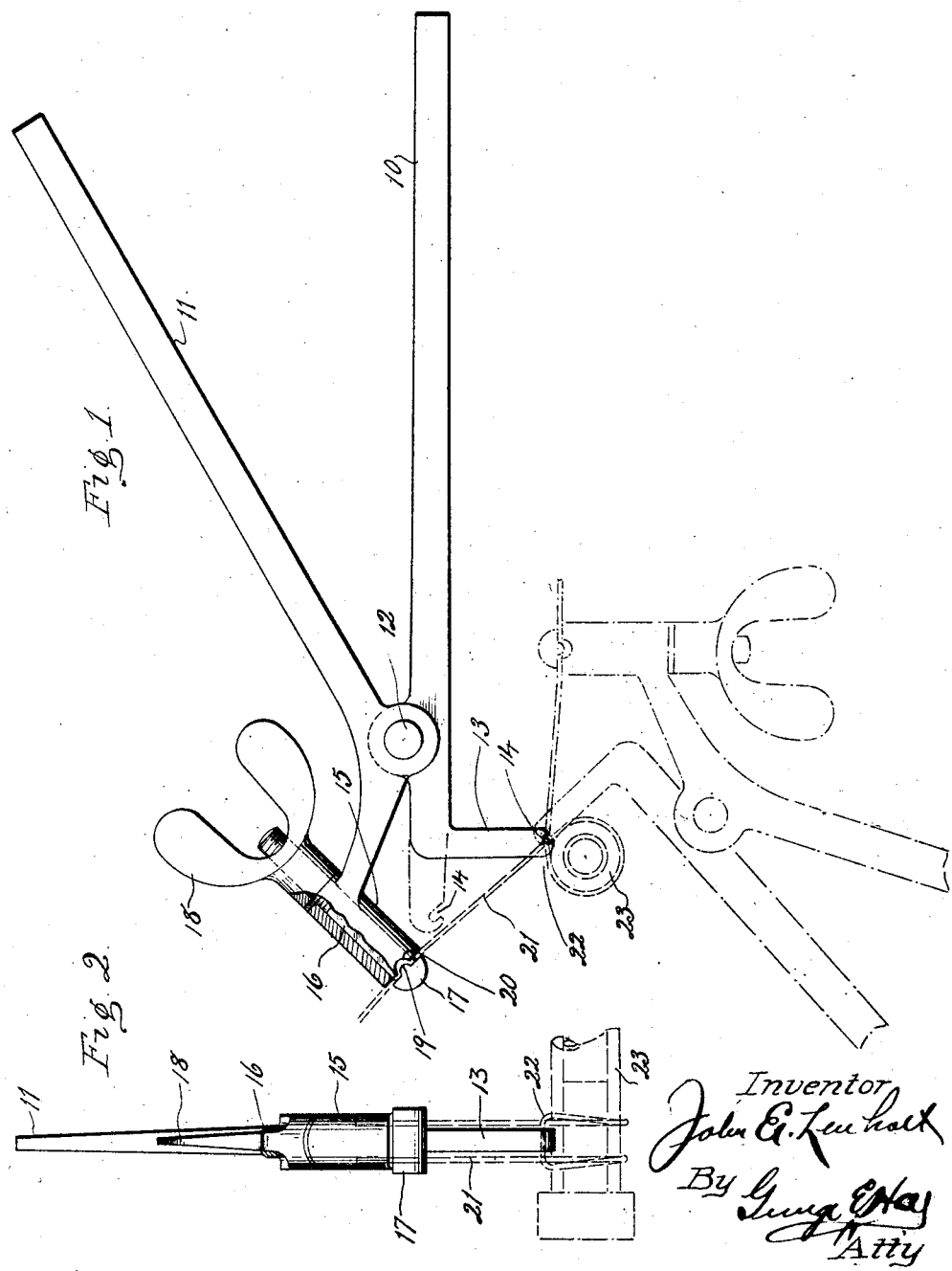

UNITED STATES PATENT OFFICE.

JOHN E. LENHOLT, OF GUILFORD, CONNECTICUT, ASSIGNOR OF ONE-HALF TO CHARLES R. TAINTER, OF GUILFORD, CONNECTICUT.

COUPLING-FASTENER.

1,378,693.  Specification of Letters Patent.  Patented May 17, 1921.

Application filed October 22, 1919, Serial No. 332,483. Renewed October 20, 1920. Serial No. 418,342.

*To all whom it may concern:*

Be it known that I, JOHN E. LENHOLT, a citizen of the United States, residing at Guilford, in the county of New Haven and State of Connecticut, have invented certain new and useful Improvements in Coupling-Fasteners, of which the following is a specification, reference being had therein to the accompanying drawings.

This invention relates to an improved coupling fastener of the type designed for binding a flexible metal band around a circular body so as to provide means to hold the same securely upon a part connected therewith.

It is the object of this invention, among other things, to provide a device that will operate with strands of wire or strips of metal cut from a length as distinguished from bands or loops previously prepared of fixed and determined shape and size, and which will be most efficient in its operation, easily manipulated, as well as composed of few parts, so designed as to be produced at the minimum cost and economically assembled.

To these, and other ends, my invention consists in the coupling fastener having certain details of construction and combinations of parts as will be hereinafter referred to and more particularly pointed out in the claims.

Referring to the drawings, in which like numerals of reference designate like parts in the several figures;

Figure 1 is an elevation, partly in section, of my improved device, shown by full lines in the position occupied by the parts when it first engages the band or coupling and by broken lines at the completion of its operations; and Fig. 2 is another elevation thereof looking toward the left of Fig. 1.

Two ends of a flexible hose are usually secured together by a metal bushing inserted therein or the end of a piece of hose is secured to a metal connection by the insertion of the latter therein and wrapping around the outside of the flexible hose a loop or band of metal, usually made of wire of a predetermined shape and size and then secured in place by tongs, pliers or similar devices.

This invention relates to the securing mechanism and is so designed and arranged that instead of requiring a prepared loop or band of predetermined size, shape, etc. it is operable with a wire or length cut from a roll or strip at the time of its use, and in addition thereto it is so arranged that a maximum leverage may be obtained so as to insure a tight grip of the band or coupling and thus assure a joint that will withstand great internal pressure.

In the practice of my invention, I provide two arms 10,—11 which are hinged together by the pintle 12, the arm 10 adjacent to the pivot having an offset portion 13 provided with a notch 14 in its outer end and the arm 11 adjacent to the pintle 12 having a head 15 within which is mounted the shank 16 of the jaw 17, upon which shank is threaded the thumb nut 18. The inner face of the jaw 17 is provided with lips 19 which register with recesses 20 in the end of the head 15.

In operation a strand of wire or strip of metal 21 is cut of any desired length and then bent to form a U shape structure with the head portion designated 22. This is then wound around the hose 23 and the free ends thereof projected under the head portion 22, as shown in the drawing. My device is now applied by placing the head portion 22 in the notch 14 and projecting the free ends of the wire or metal between the end of the head 15 and inner face of the jaw 17 upon either side of the shank 16, as shown in Fig. 2. The thumb nut 18 is now rotated upon the shank 16 and said free ends are securely held against relative movement between the head 15 and jaw 17 slipping therebetween being prevented by reason of the lips 19 forcing the wire strand into the recesses 20. When the parts are in the position just described the arms are gripped at their outer ends and moved toward each other which action draws the head 15 away from the recessed end of the offset portion 13, thereby pulling the coupling taut around the hose. The device is now moved in a circular path about the hose 23, the notch 14 in the offset portion 13 providing the fulcrum upon the head portion 22. This movement is continued until the parts occupy the position substantially shown by the broken lines in Fig. 1, at which time the free ends of the wire or strip of metal 21 projecting beyond the head 22 have been bent over the head portion 22, providing a lock for the same. The wire is now cut at any desired point between the notch 14 and the jaw 17, which permits disengagement of the device and the free ends of the band projecting beyond the head portion 22 are either left as they then are or hammered down for a smooth finish.

For some classes of work it is desirable that the offset arm 13 should not be provided, in which case the notch 14 can be provided in the end of the arm 10, as shown by broken lines in Fig. 1, and in other ways the details of my invention may be materially altered, and I would therefore have it understood that I do not limit myself to the exact construction herein shown and described, but claim all that falls fairly within the spirit and scope of my invention.

Having described my invention, what I claim as new and desire to secure by Letters Patent, is:

1. In a device of the character described, the combination with a pair of pivotally connected arms, one of said arms being notched at the end thereof adjacent to the pivotal connection and the other arm having a head at the end thereof, and a jaw having a shank slidably mounted thereon, with means for securing said jaw in its closed position, said jaw having a head thereon which extends upon either side of said shank, whereby two pieces may be secured by said jaw with an open space between them.

2. In a device of the character described, the combination with a pair of pivotally connected arms, one of said arms being notched at the end thereof adjacent to the pivotal connection and the other arm having a head at the end thereof, a jaw having a shank slidably mounted thereon, with means for securing said jaw in its closed position, said jaw having a head thereon which extends upon either side of said shank whereby two pieces may be secured by said jaw with an open space between them; and a lip upon each of said projecting portions of said head which register with a detent in the head on said arm.

In testimony whereof, I have hereunto affixed my signature.

JOHN E. LENHOLT.